(12) United States Patent
Burtscher et al.

(10) Patent No.: US 9,669,478 B2
(45) Date of Patent: Jun. 6, 2017

(54) MILLING TOOL

(71) Applicant: CERATIZIT AUSTRIA GMBH, Reutte (AT)

(72) Inventors: Peter Burtscher, Haeselgehr (AT); Josef Prast, Pflach (AT)

(73) Assignee: Ceratizit Austria GmbH, Reutte (AT)

( * ) Notice: Subject to any disclaimer, the term of this patent is extended or adjusted under 35 U.S.C. 154(b) by 0 days.

(21) Appl. No.: 14/769,732

(22) PCT Filed: Feb. 18, 2014

(86) PCT No.: PCT/AT2014/000032
§ 371 (c)(1),
(2) Date: Aug. 21, 2015

(87) PCT Pub. No.: WO2014/127391
PCT Pub. Date: Aug. 28, 2014

(65) Prior Publication Data
US 2015/0375309 A1 Dec. 31, 2015

(30) Foreign Application Priority Data

Feb. 22, 2013 (AT) .......................... 60/2013

(51) Int. Cl.
B23B 31/10 (2006.01)
B23C 5/10 (2006.01)
(Continued)

(52) U.S. Cl.
CPC .............. *B23C 5/10* (2013.01); *B23B 31/005* (2013.01); *B23B 31/11* (2013.01);
(Continued)

(58) Field of Classification Search
CPC .......... Y10T 408/907; Y10T 408/9098; Y10T 408/90987; Y10T 408/90993;
(Continued)

(56) References Cited

U.S. PATENT DOCUMENTS 2,158,120 A * 5/1939 Hirschberg ............. E21B 17/04
175/417
2,219,907 A * 10/1940 Ross .................... B23B 31/113
279/93
(Continued)

FOREIGN PATENT DOCUMENTS

CN 1174529 2/1988
CN 1610590 4/2005
(Continued)

*Primary Examiner* — Sunil K Singh
*Assistant Examiner* — Nicole N Ramos
(74) *Attorney, Agent, or Firm* — Laurence A. Greenberg; Werner H. Stemer; Ralph E. Locher

(57) ABSTRACT

A milling tool has a tool shank and a cutting head fastened to the forward end of the tool shank by way of a clamping connection. The clamping connection has a protrusion with clamping faces, and a recess with centering faces that interact with the clamping faces. Each of the centering faces has a first region where the centering faces are spaced from a longitudinal axis of the tool shank by a first distance and a second region at a smaller distance. The first region merges into the second region. The clamping faces of the protrusion are introducible into the recess between the first regions of the centering faces and are movable, by rotation of the cutting head about the longitudinal axis, into a clamping position in which the clamping faces interact in a force-fit with the second regions of the centering faces.

16 Claims, 5 Drawing Sheets

(51) Int. Cl.
*B23B 31/00* (2006.01)
*B23B 31/11* (2006.01)

(52) U.S. Cl.
CPC ... *B23B 2231/0204* (2013.01); *B23B 2240/32* (2013.01); *B23B 2251/02* (2013.01); *B23C 2210/02* (2013.01); *B23C 2210/03* (2013.01); *B23C 2240/24* (2013.01)

(58) Field of Classification Search
CPC . Y10T 408/909; Y10T 408/94; Y10T 408/95; Y10T 408/957; Y10T 279/17888; Y10T 279/17931; Y10T 279/17965; Y10T 403/7005; Y10T 403/7009; Y10T 407/1906; Y10T 407/1936; Y10T 407/22; Y10T 407/2274; Y10T 407/2276; B23B 2231/0204; B23B 2231/04; B23B 2240/04; B23B 2240/32; B23B 2251/02; B23B 2251/50; B23B 27/10; B23B 27/16
See application file for complete search history.

(56) References Cited

U.S. PATENT DOCUMENTS

| | | | | |
|---|---|---|---|---|
| 3,566,947 | A | * | 3/1971 | Jukes ............... F16B 37/122 29/523 |
| 3,711,105 | A | | 1/1973 | Johanson |
| 4,325,665 | A | * | 4/1982 | Jukes ............... F16B 37/125 29/522.1 |
| 4,856,944 | A | | 8/1989 | Reinauer |
| 5,542,795 | A | | 8/1996 | Mitchell |
| 5,551,811 | A | * | 9/1996 | Satran ............... B23B 31/008 407/40 |
| 5,607,263 | A | | 3/1997 | Nespeta et al. |
| 6,276,879 | B1 | * | 8/2001 | Hecht ............... B23B 31/008 279/93 |
| 7,004,692 | B2 | | 2/2006 | Hecht |
| 7,189,039 | B2 | | 3/2007 | Pantzar |
| 7,431,543 | B2 | | 10/2008 | Buettiker et al. |
| 7,775,751 | B2 | * | 8/2010 | Hecht ............... B23D 77/006 279/8 |
| 2002/0053266 | A1 | * | 5/2002 | Enquist ............ B23B 27/1655 82/1.11 |
| 2005/0220551 | A1 | | 10/2005 | Buettiker et al. |
| 2007/0081872 | A1 | | 4/2007 | Blomstedt et al. |
| 2007/0220731 | A1 | * | 9/2007 | Soroka ............. B23B 31/202 29/447 |
| 2012/0039676 | A1 | * | 2/2012 | Marshansky ...... B23C 5/1054 407/48 |
| 2012/0099938 | A1 | | 4/2012 | Shitrit et al. |
| 2014/0017022 | A1 | | 1/2014 | Schwaegerl et al. |

FOREIGN PATENT DOCUMENTS

| | | |
|---|---|---|
| CN | 1620351 A | 5/2005 |
| DE | 1253015 B | 10/1967 |
| DE | 19600239 C1 | 4/1997 |
| DE | 10255270 A1 | 6/2004 |
| DE | 20306151 U1 | 6/2004 |
| DE | 202006014812 U1 | 12/2006 |
| DE | 202008014738 U1 | 1/2009 |
| DE | 102012212146 A1 | 1/2014 |
| EP | 0284745 A2 | 10/1988 |
| WO | 9423874 A1 | 10/1994 |
| WO | 03101650 A1 | 12/2003 |

* cited by examiner

MILLING TOOL

BACKGROUND OF THE INVENTION

Field of the Invention

The present invention relates to a milling tool having a tool shank and a cutting head fastened to the front side of the tool shank, to a cutting head for such a milling tool, to the use of such a cutting head, and to a method for fastening a cutting head to a tool shank of a milling tool.

In the machining of in particular metal materials, use is usually made of tools which are formed from a hard material at least in the region of the cutting edges that come into contact with the material. Hard materials that are used, in addition to hard metal and cermets, include ultrahard materials such as, in particular, polycrystalline diamond (PCD) or cubic boron nitride (CBN). Here, it is known to manufacture the entire tool, for example a milling tool, from the hard material, although this requires a relatively large amount of the valuable and relatively brittle hard material. Alternatively, it is known to equip a tool shank, which may be manufactured from a tougher and more cost-effective material, for example tool steel, with exchangeable components made of hard material, which are provided with the cutting edges. This solution has the advantage that the material requirement for the hard material can be reduced and in the event of wear occurring to the cutting edges, only the exchangeable components made of hard material have to be exchanged.

In particular milling tools are in this case frequently formed with a tool shank made for example of tool steel, which is equipped with a plurality of indexable cutting inserts which may each have a plurality of cutting edges which can be brought successively into use by indexing in the event of wear occurring. On account of the miniaturization, which is possible only within certain limits, of the indexable cutting inserts and receptacles in which the latter are fastened, it is difficult, with this type of construction, to provide milling tools which have a small diameter and at the same time a relatively large number of cutting edges or teeth that are employable at the same time.

In order to be able to realize the advantages of exchangeable cutting edges made of hard metal also in milling tools having small diameters, DE 203 06 151U1, for example, discloses a milling tool which has a tool shank to the front side of which an exchangeable cutting head is fastened, said cutting head being provided with a plurality of cutting edges. In the case of the milling tool described in DE 203 06 151U1, the tool shank has a front-side recess into which a protrusion on the underside of the cutting head, which has exactly the shape of the recess, is introduced in a form-fitting manner in the axial direction. However, this configuration requires the maintenance of extremely tight tolerances for the protrusion on the underside of the cutting head.

BRIEF SUMMARY OF THE INVENTION

It is the object of the invention to provide a milling tool which, even in the case of a small diameter, allows a large number of simultaneously employable cutting edges and in the process provides easy but nevertheless exact fastening of a cutting head on a tool shank, this not requiring any mechanical precision machining of that region of the cutting head that serves for fastening.

The object is achieved by a milling tool as claimed. Advantageous developments are specified in the dependent claims.

The milling tool has a tool shank with a longitudinal axis and a cutting head fastened to the front side of the tool shank, said cutting head having a plurality of cutting edges for machining a workpiece. The tool shank and the cutting head are connected together via a clamping connection. The clamping connection has a protrusion circumferentially having a plurality of clamping faces, and a recess circumferentially having a plurality of centering faces that interact with the clamping faces. The centering faces each have a first region in which the centering faces are at a first distance from the longitudinal axis in a section perpendicular to the longitudinal axis, and the first region transitions into a second region in which the centering faces are at a smaller second distance from the longitudinal axis in the section perpendicular to the longitudinal axis, such that the clamping faces of the protrusion are introducible into the recess between the first regions of the centering faces and are movable, by rotation of the cutting head about the longitudinal axis relative to the tool shank, into a clamping position in which the clamping faces interact in a force-fitting manner with the second regions of the centering faces.

The protrusion of the clamping connection can in this case, according to a preferred first variant, be formed on the cutting head and the recess in the tool shank. According to a second variant, however, the recess of the clamping connection can also be formed in the cutting head and the protrusion on the tool shank. As a result of the specified configuration of the clamping connection between the cutting head and the tool shank, a self-centering and reliable connection is allowed between the tool shank and the cutting head, said connection not requiring any reworking of that part of the clamping connection that is formed on the cutting head, such that the cutting head is producible cost-effectively in a powder metallurgical production process by pressing and sintering from pulverulent starting material. Furthermore, as a result of the self-centering effect of the specified configuration of the recess and protrusion and as a result of the force-fitting interaction of the clamping faces with the second regions of the centering faces, the forces that act on a fastening screw in order to fasten the cutting head to the tool shank are kept very low, with the result that the reliability of the milling tool is increased. Furthermore, in the case of the specified configuration, it is advantageously possible for the contact regions, effecting the force fit, of the clamping faces with the centering faces to extend at least substantially tangentially in a circle, the center of which is located on the longitudinal axis of the milling tool. The forces effecting the force fit flow in this case substantially in a radial direction. The expression substantially tangential is understood to mean in this case a deviation from the tangential direction of less than 10°, preferably less than 8°, more preferably less than 5°. Where the terms axial, radial or tangential, or forms derived therefrom, are used in the context of the present description, these terms relate in each case to the longitudinal axis of the milling tool, said axis at the same time forming the rotation axis during operation of the milling tool. As a result of the formation of the force-fitting connection between the clamping faces and the second regions of the centering faces, the cutting head is furthermore held in a self-locking manner on the tool shank in the clamping position.

According to one development, the recess has a plurality of radially inwardly projecting stop portions which limit a rotation of the cutting head about the longitudinal axis relative to the tool shank. As a result of the stop portions, the clamping position of the cutting head on the tool shank can be determined exactly, and the clamping forces acting in the radial direction, which effect the force fit between the cutting head and the tool shank, can be limited reliably, such that an undesirably high application of force on the walls of the recess is prevented. Furthermore, the stop portions serve at the same time as entrainment portions which facilitate reliable transmission of the rotation from the tool shank to the cutting head.

According to one development, the clamping faces extend in a common circle, the center of which is located on the longitudinal axis, when viewed in a section perpendicular to the longitudinal axis. In this case, a particularly uniform introduction of the clamping forces and reliable centering of the cutting head relative to the tool shank are achieved. According to a preferred configuration, the clamping faces can also have n-fold symmetry with regard to a rotation about the longitudinal axis, where $n \in \{2, 3, 4, \ldots\}$, and preferably $n=3$.

According to one development, the clamping faces extend along a common cylinder or cone surface, the axis of symmetry of which coincides with the longitudinal axis. In this case, particularly easy manufacture of the clamping faces is allowed. In particular in a case in which the clamping faces are formed on the cutting head, particularly easy powder metallurgical manufacture of the clamping faces without mechanical reworking is allowed. In the case of an extent along a cone surface, the protrusion narrows preferably in the direction of its free end.

According to one development, the protrusion has three clamping faces. In this case, reliable centering of the cutting head in and fastening thereof to the tool shank is allowed with tight tolerance specifications. Preferably, the clamping faces are distributed regularly around the outer circumference of the protrusion in this case.

According to one development, the clamping faces form the radially furthest protruding regions of the protrusion in a section perpendicular to the longitudinal axis. In this case, force introduction for the force-fitting connection between the clamping faces and the centering faces is reliably achieved, with the acting forces flowing substantially in the radial direction.

According to one development, the cutting head has a bore for receiving a fastening screw, and the bore extends in the axial direction through the cutting head. In this case, particularly reliable and symmetrical fastening of the cutting head to the tool shank is achieved.

According to one development, a coaxial threaded bore for fastening the cutting head to the tool shank is formed in the tool shank. As a result of the coaxial arrangement of the threaded bore, the weakening, brought about by the threaded bore, of the tool shank can be kept low.

According to one development, provision is made of a threaded bush, which has an external thread for interacting with the threaded bore in the tool shank, and an internal thread for interacting with a fastening screw for fastening the cutting head. The threaded bush allows reliable releasing of the cutting head from the tool shank when the cutting head is intended to be exchanged.

According to one development, the threaded bush has an outside diameter, at least on a side facing the cutting head, which is greater than an inside diameter of a bore in the cutting head. In this case, the force-fitting connection between the cutting head and the tool shank can be released particularly reliably in that that side of the threaded bush that faces the cutting head is pressed against the cutting head.

Preferably, the threaded bush is provided on a side facing the cutting head with a profile for engagement by a screw-driving tool, such that the threaded bush can be moved easily in order to release the force-fitting connections between the cutting head and the tool shank. Preferably, the profile can be formed in this case for example by an internal profile, such as in particular a hexagon socket.

Preferably, the cutting head has a bore for receiving a fastening screw, the diameter of said bore being coordinated with the profile for engagement by a screwdriving tool such that a screwdriving tool is able to be brought into engagement with the profile through the bore in the cutting head. In this case, particularly convenient exchange of the cutting head is allowed. In order to achieve this, in particular at least parts of the profile can have an inside diameter which is smaller than the diameter of the bore in order to receive the fastening screw.

According to a preferred configuration, the protrusion of the clamping connection is formed integrally with the cutting head and the recess of the clamping connection is formed in the front side of the tool shank. In this case, the protrusion that is under pressure in the clamping position is formed from the usually more brittle material of the cutting head and the recess is formed from the tougher material of the tool shank, such that undesired splitting of the material of the cutting head can be reliably prevented. Preferably, the protrusion is formed with the rest of the cutting head in a common powder metallurgical production process, such that the protrusion and the rest of the cutting head have a substantially homogeneous microstructure.

According to another configuration, the protrusion of the clamping connection is formed integrally with the tool shank and the recess of the clamping connection is formed in the cutting head.

According to a preferred development, the cutting head is formed from a hard material, in particular hard metal or a cermet.

The object is also achieved by a cutting head for an above-described milling tool as claimed. Advantageous developments are specified in the dependent claims.

The cutting head for an above-described milling tool has a plurality of cutting edges for machining a workpiece, and a protrusion, formed integrally with the cutting head, having a plurality of clamping faces for the simultaneous clamping and centering of the cutting head in a recess in a tool shank. The clamping faces are configured to form a force-fitting connection with centering faces in the recess. The clamping faces extend along the contour of a common circle, the center of which is located on the longitudinal axis, in a section perpendicular to a longitudinal axis of the cutting head.

With the cutting head, the advantages specified above with regard to the milling tool are achieved. As a result of the arrangement of the clamping faces such that these extend along the contour of the common circle, in particular a self-centering and reliable connection to the tool shank is achieved, said connection not requiring any reworking of the protrusion on the cutting head. Furthermore, forces acting on a fastening screw for fastening the cutting head to the tool shank are kept very low. In addition, the contact regions, effecting the force fit, of the clamping faces with the centering faces extend at least substantially tangentially in a circle, the center of which is located on the longitudinal axis.

According to one development, the protrusion has flattened portions, arranged between adjacent clamping faces, for support against radially inwardly protruding stop portions in a recess in a tool shank. As a result of the flattened portions, the clamping position of the cutting head in the recess can be determined exactly, and the clamping forces acting in the radial direction, which effect the force fit between the cutting head and the tool shank, can be limited reliably, such that an undesirably high application of force on the walls of the recess is prevented. Furthermore, via the flattened portions, reliable transmission of the rotation from the tool shank to the cutting head is allowed during operation of the milling tool.

According to one development, the clamping faces form the radially furthest protruding regions of the protrusion in a section perpendicular to the longitudinal axis. In this case, force introduction for the force-fitting connection between the clamping faces and centering faces provided on a recess is reliably achieved, with the acting forces flowing substantially in a radial direction.

According to one development, the clamping faces extend along the contour of a common cylinder or cone surface, the axis of symmetry of which coincides with the longitudinal axis. In this case, In this case, particularly easy manufacture of the clamping faces is allowed, in particular powder metallurgical manufacture of the clamping faces without mechanical reworking.

The object is also achieved by the use of such a cutting head as claimed.

This is the use of such a cutting head on a tool shank having a longitudinal axis and a front-side recess which circumferentially has a plurality of centering faces interacting with the clamping faces. The centering faces each have a first region in which the centering faces are at a first distance from the longitudinal axis in a section perpendicular to the longitudinal axis, and the first region transitions into a second region in which the centering faces are at a smaller second distance from the longitudinal axis in the section perpendicular to the longitudinal axis. In the use, the clamping faces are brought into a force-fitting connection with the second regions of the centering faces.

The object is also achieved by a method for fastening a cutting head to a tool shank as claimed.

This is a method for fastening for fastening a cutting head to a tool shank of a milling tool, wherein the tool shank has a longitudinal axis and the cutting head has a plurality of cutting edges for machining a workpiece, wherein the tool shank and the cutting head are connected together via a clamping connection, which clamping connection has a protrusion circumferentially having a plurality of clamping faces, and a recess circumferentially having a plurality of centering faces that interact with the clamping faces, and wherein the centering faces each have a first region in which the centering faces are at a first distance from the longitudinal axis in a section perpendicular to the longitudinal axis, and the first region transitions into a second region in which the centering faces are at a smaller second distance from the longitudinal axis in the section perpendicular to the longitudinal axis. The method has the following steps: introduction of the clamping faces of the protrusion between the first regions of the centering faces and into the recess, and rotation of the cutting head about the longitudinal axis relative to the tool shank and into a clamping position such that the clamping faces pass into a force-fitting connection with the second regions of the centering faces.

Further advantages and expedient aspects of the invention can be gathered from the following description of exemplary embodiments with reference to the appended figures.

DESCRIPTION OF THE INVENTION

A milling tool 1 according to one embodiment of the present invention is described in the following text with reference to FIGS. 1 to 16.

The milling tool 1 has a tool shank 2, which is configured to be fastened by way of a rear end 2a to a corresponding receptacle in a milling machine. The tool shank 2 has a longitudinal axis L, which simultaneously forms the rotation axis of the milling tool 1 during operation of the milling tool 1 in a milling machine. The tool shank 2 has substantially a cylindrical basic shape, wherein, in the exemplary embodiment illustrated, the outside diameter at a front end 2b opposite the rear end 2a is somewhat smaller than at the rear end 2a.

Figure 1:
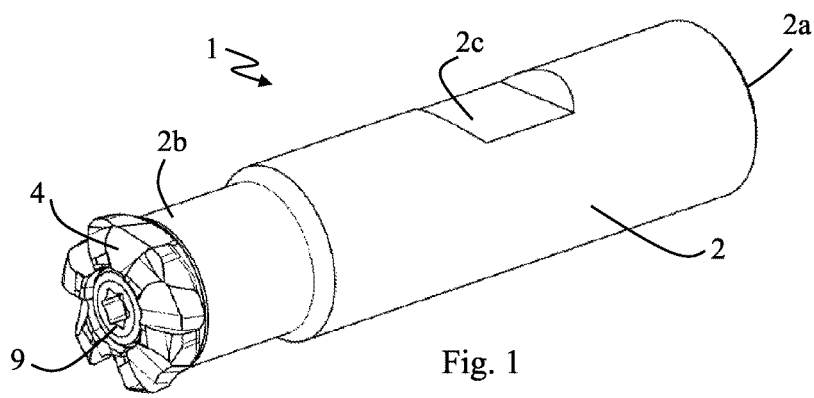
FIG. 1: shows a perspective illustration of a milling tool according to one embodiment.
Figure 2:
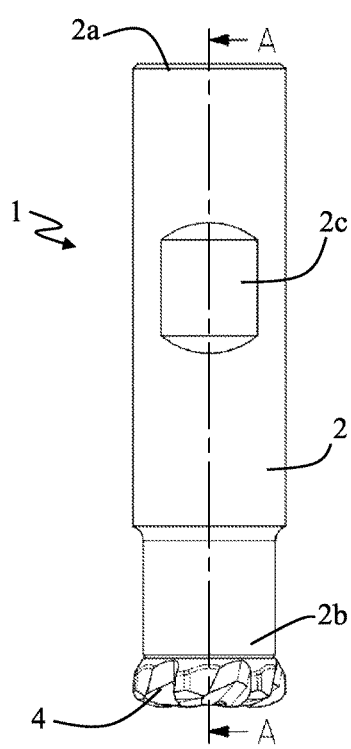
FIG. 2: shows a side view of the milling tool according to the embodiment.
Figure 3:
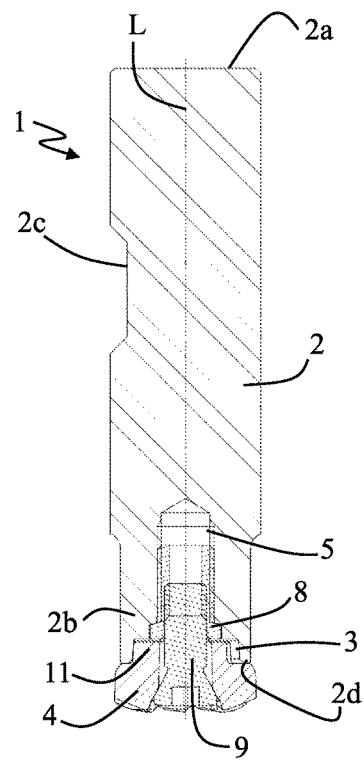
FIG. 3: shows a sectional illustration along the line A-A in FIG. 2.

As can be seen in particular in FIG. 1 to FIG. 3, the tool shank 2 has on its outer circumference a notch 2c for fastening to the receptacle of the milling machine in a rotationally locked manner.

Formed at the front end 2b of the tool shank 2 is a recess 3, which will be described in more detail in the following text. The recess 3 is configured such that a cutting head is fastenable to the front side of the tool shank 2. The recess 3 is surrounded at the front end 2b by a flat abutment face 2d, which extends perpendicularly to the longitudinal axis L of the tool shank 2 and forms a large support for the cutting head 4 fastened to the tool shank 2.

Figure 7:
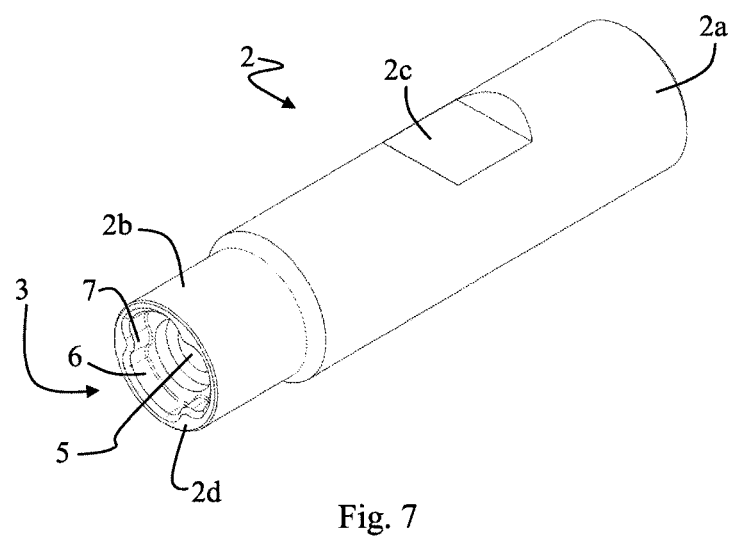
FIG. 7: shows a perspective illustration of the tool shank in the embodiment.
Figure 8:
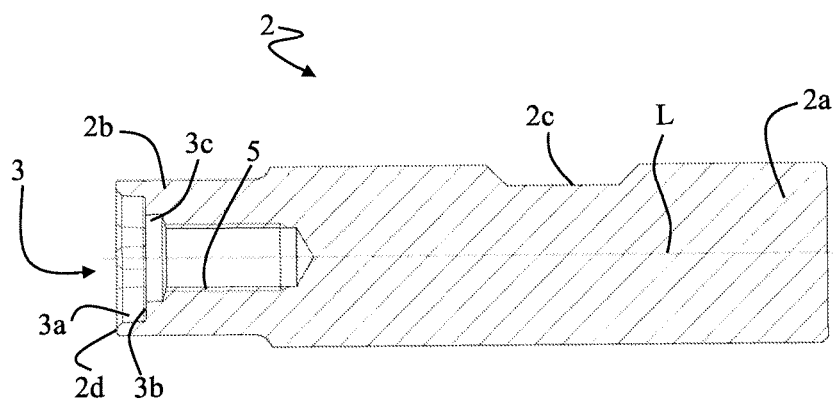
FIG. 8: shows a sectional illustration of the tool shank.
Figure 9:
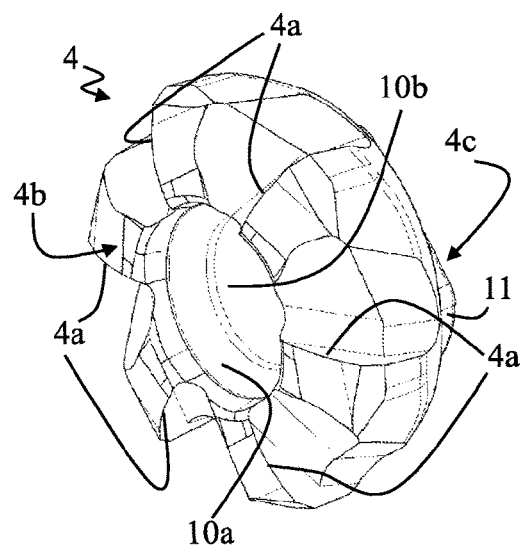
FIG. 9: shows a perspective illustration of a cutting head in the embodiment.

As can be seen in particular in FIG. 7 and FIG. 8, the recess 3 has, next to the free end, a first portion 3a having a relatively large cross section. The first portion 3a is adjoined, via a shoulder 3b, by a substantially cylindrical second portion 3c having a smaller cross section, which is adjoined, via a further shoulder, by a threaded bore 5 coaxial with the longitudinal axis L. The threaded bore 5 is embodied as a blind hole, which is provided with an internal thread, the function of which will be described in more detail. In the direction perpendicular to the longitudinal axis L, the threaded bore 5 has a cross section which is smaller than the cross section of the first portion 3a of the recess 3.

Figure 6:
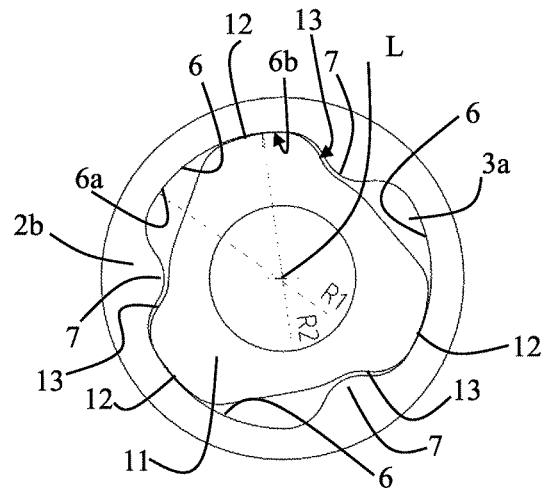
FIG. 6: shows a schematic basic illustration to explain the clamping connection in the embodiment.

The shape of the first portion 3a of the recess 3 will be explained in more detail with reference to FIG. 6 and FIG. 7. As can be seen in FIG. 6, the first portion 3a has, in the plane perpendicular to the longitudinal axis L, a shape which is similar to a stylized three-leaf clover. The side walls of the recess 3 are formed in the first portion 3a by three centering faces 6, between which radially inwardly protruding stop portions 7 are formed. The centering faces 6 and the stop portions 7 are in this case distributed regularly around the circumference of the first portion 3a, such that the first portion 3a has n-fold symmetry with respect to a rotation about the longitudinal axis L, where n=3. In other words, the first portion 3a has three-fold rotational symmetry with respect to the longitudinal axis L. The centering faces 6 are formed in a concave manner. The stop portions 7 are formed in a convex manner in a section perpendicular to the longitudinal axis L, such that they form radially inwardly protruding protrusions. In the exemplary embodiment illustrated, the centering faces 6 and the stop portions 7 extend in each case at least substantially parallel to the longitudinal axis L. According to one development, however, it is for example also possible for the internal cross section of the first portion 3a to narrow in the direction from the front end 2b to the rear end 2a of the tool shank 2.

As is explained by way of example with regard to one of the centering faces 6, the centering face 6 have, in a section perpendicular to the longitudinal axis L, a first region 6a, in which the centering faces 6 are at a first distance from the longitudinal axis L. In the embodiment illustrated, the first region 6a transitions continuously into a second region 6b, in which the centering faces 6 are at a smaller, second distance from the longitudinal axis L. In other words, the surfaces of the centering faces 6 approach the longitudinal axis L with continued progress around the longitudinal axis L. In the embodiment illustrated, the centering faces 6 are oriented such that, with a viewing direction toward the front end 2b of the tool shank 2, they approach the longitudinal axis L with continued progress in the clockwise direction around the longitudinal axis L. However, depending on the intended direction of rotation of the milling tool 1, it is for example also possible to configure the centering faces 6 such that they approach the longitudinal axis L with continued progress in the counterclockwise direction. In any case, it is preferred for the centering faces 6 to approach the longitudinal axis L with continued progress counter to the intended direction of rotation when the milling tool 1 is used. Preferably, the centering faces 6 have in this case a concavely curved shape. The centering faces 6 can for example preferably have a cylindrically or elliptically curved shape, such that they approach the longitudinal axis L as uniformly as possible with continued rotation.

Figure 4:
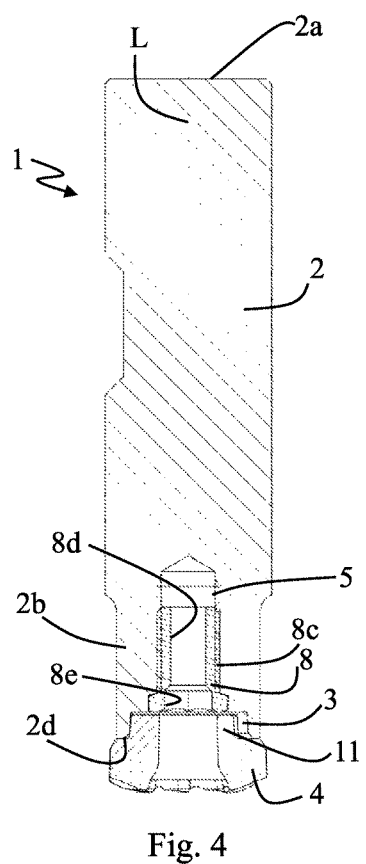
FIG. 4: shows a sectional illustration corresponding to FIG. 3 but without a fastening screw.
Figure 5:
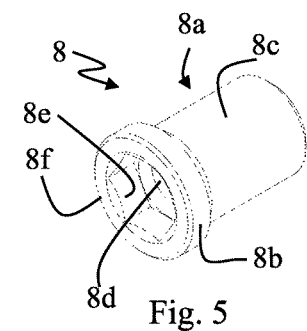
FIG. 5: shows a perspective illustration of the threaded bush in the embodiment.

As can be seen in particular in FIG. 3, FIG. 4 and FIG. 5, provision is also made of a threaded bush 8, which is received at least partially in the threaded bore 5. The threaded bush 8 has a threaded portion 8a, which is provided at least regionally with an external thread 8c, which is intended to interact with the internal thread of the threaded bore 5. The threaded bush 8 also has a head portion 8b. In the embodiment illustrated, the head portion 8b has a somewhat larger external circumference than the threaded portion 8a. The head portion 8b is dimensioned such that, when the threaded portion 8a is screwed into the threaded bore 5, it can be received in the second portion 3c of the recess 3. The threaded bush 8 has, at least in the head portion 8b, an outside diameter which is larger than the diameter of a bore 10 in the cutting head 4, as will be described in more detail. The front side 8f of the head portion 8b has a face which is configured to press against an underside of the cutting head 4. In the threaded portion 8a, the threaded bush 8 is furthermore provided at least regionally with an internal thread 8d, which is configured to interact with an external thread of a fastening screw 9 in order to fasten the cutting head 4 to the tool shank 2.

In the region of the head portion 8b, the threaded bush 8 is furthermore provided on its inner side with a profile 8e for engagement by a screwdriving tool. In the embodiment illustrated, the profile 8e for engagement by a screwdriving tool is configured for example as a hexagon socket. However, some other shape, which allows interaction with a corresponding screwdriving tool, is also possible. As can be seen in particular in FIG. 4, the profile 8e for engagement by a screwdriving tool has a free internal cross section which is somewhat larger than the diameter of the internal thread 8d. As a result, the external thread of the fastening screw 9 can be guided through the head portion 8b to the internal thread 8d.

The configuration of the cutting head 4 in the present exemplary embodiment will now be described in more detail with reference to FIG. 9 to FIG. 12. The cutting head 4 is configured in the embodiment as an integral component produced from hard metal or cermet in a powder metallurgical production process by pressing and sintering. The cutting head 4 is provided with a plurality of cutting edges 4a for machining a workpiece. In the exemplary embodiment illustrated in the figures, the cutting head 4 is configured specifically for high-feed milling, as is apparent from the arrangement of the cutting edges 4a. However, it is also possible to provide cutting edges of different types, such that the cutting head 4 can be used for other milling operations.

The cutting head 4 is provided with a bore 10 which extends in the axial direction through the cutting head 4 and penetrates the cutting head 4 from the front side 4b to the rear side 4c. The bore extends coaxially with a longitudinal axis of the cutting head 4, which coincides with the longitudinal axis L of the tool shank 2. The bore 10 is configured to receive a fastening screw 9 in order to fasten the cutting head 4 to the tool shank 2. On its side facing the front side 4b, the bore 10 has a first portion with a widened cross section, which is configured to receive the head of the fastening screw 9. The first portion has at least one abutment face 10a, against which the underside of the head of the fastening screw 9 is supported in order to clamp the cutting head 4 against the tool shank 2. In the exemplary embodiment, the first portion has for example a cross section that narrows conically in the direction of the rear side 4c of the cutting head 4 in order to receive a conical countersunk head of the fastening screw 9. However, other configurations are for example also possible, such as in particular a stepped configuration in order to receive a flat or cylindrical head of the fastening screw 9.

In the exemplary embodiment, the first portion transitions into a second portion 10b, which has a smaller diameter with a substantially cylindrical cross section. The diameter of the second portion 10b is dimensioned such that the external thread on a threaded portion of the fastening screw 9 can be guided through the second portion 10b. The diameter of the second portion 10b is furthermore dimensioned such that it is smaller than the outside diameter of the head portion 8b of the threaded bush 8.

In the exemplary embodiment shown, a protrusion 11 is formed on the rear side 4c of the cutting head 4. The protrusion 11 has a smaller external circumference than the front side 4b of the cutting head 4, such that a flat bearing face 4d is formed on the rear side 4c of the cutting head 4, the cutting head 4 being supported on the flat abutment face 2d of the tool shank 2 by way of said flat bearing face 4d. In the exemplary embodiment, the bearing face 4d extends around the protrusion 11 in a plane perpendicular to the longitudinal axis L. In the axial direction, the protrusion 11 has a height which is somewhat smaller than the depth of the first portion 3a of the recess 3. This ensures that the cutting head 4 is supported reliably on the flat abutment face 2d of the tool shank 2 by way of the bearing face 4d. The bore 10, in particular the second portion 10b thereof, also extends through the protrusion 11.

The protrusion 11 and the recess 3 together form a part of a clamping connection between the cutting head 4 and the tool shank 2. In this case, the protrusion 11 and the recess 3 effect clamping in an interacting manner, as will be described in more detail.

Figure 10:
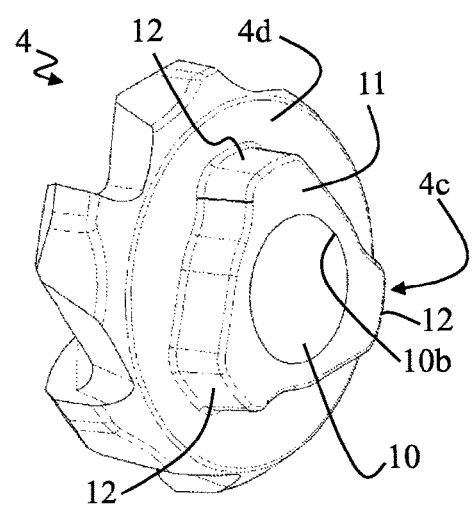
FIG. 10: shows a further perspective illustration of the cutting head.
Figure 11:
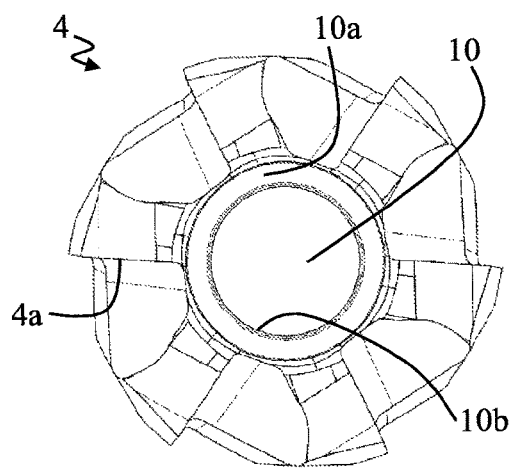
FIG. 11: shows a plan view of the front side of the cutting head.
Figure 12:
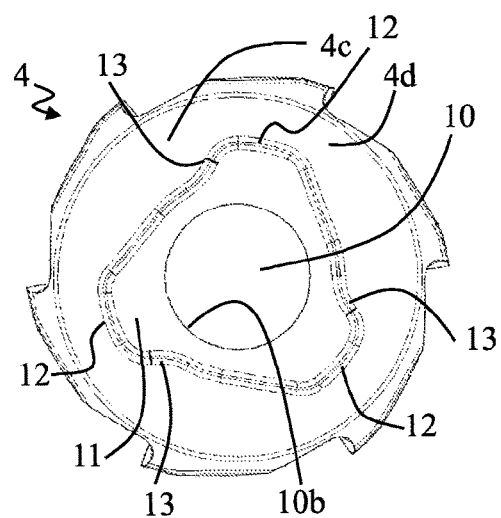
FIG. 12: shows a plan view of the rear side of the cutting head.

The external contour of the protrusion 11 is described in more detail in the following text with reference to FIG. 6, FIG. 10 and FIG. 12. The protrusion 11 has a plurality n of clamping faces 12, which are configured to interact with the centering faces 6 of the recess 3. In the exemplary embodiment, the protrusion 11 has three clamping faces 12 (n=3). The clamping faces 12 extend along the contour of a common circle, the center of which is located on the longitudinal axis L, in a section perpendicular to the longitudinal axis L. The clamping faces 12 form the radially furthest protruding regions of the protrusion 11 in the section perpendicular to the longitudinal axis L. In the exemplary embodiment illustrated, the clamping faces 12 extend along a common cylinder surface, wherein the cylinder axis corresponds to the longitudinal axis L. As has already been described with regard to the first portion 3a of the recess 3, it is for example also possible to configure the protrusion 11 such that the external circumference thereof narrows slightly toward the side facing the tool shank 2. In this case, the clamping faces 12 can for example also extend along a common cone surface, wherein the code axis extends along the longitudinal axis L. Although clamping faces 12 which are configured in a relatively extensive manner are illustrated in the exemplary embodiment, said clamping faces having a relatively large extent both in the axial direction and in the tangential direction, the size of the clamping faces 12 can also be reduced without having a significant effect on functioning. In an extreme case, the clamping faces 12 can be reduced to virtually punctiform contact regions with the centering faces 6.

Figure 13:
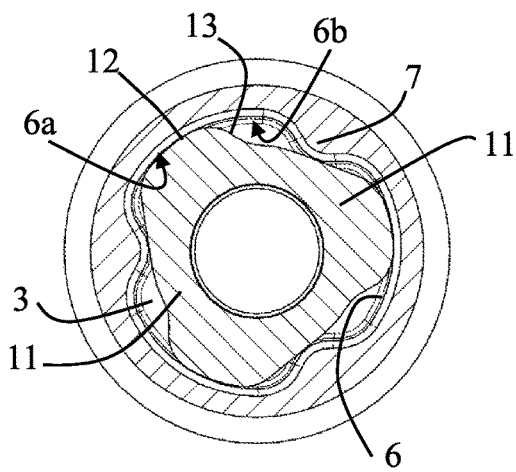
FIG. 13: shows a section perpendicular to the longitudinal axis in the region of a protrusion and of a recess of a clamping connection in a first position.
Figure 14:
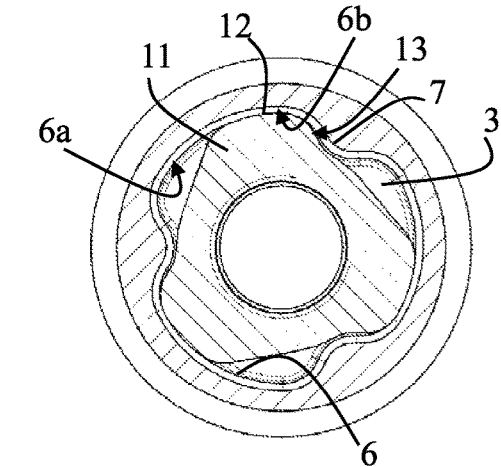
FIG. 14: shows a section perpendicular to the longitudinal axis in the region of the protrusion and of the recess in a second position.

The clamping faces 12 are distributed symmetrically around the circumference of the protrusion 11 and flattened portions 13 for support against the radially inwardly protruding stop portions 7, which are provided in the recess 3, are arranged between the clamping faces 12. In the region of the flattened portions 13, the contour of the protrusion 11 is located completely within the common circle, along which the clamping faces 12 extend, in a section perpendicular to the longitudinal axis L. In the tangential direction, the clamping faces 12 are considerably narrower than the corresponding centering faces 6, which are formed in the recess 3. In the exemplary embodiment, the clamping faces 12 are approximately half as wide as the centering faces 6, as can be seen in FIG. 6, FIG. 13 and FIG. 14. As a result of this configuration, the protrusion 11 has, in a section perpendicular to the longitudinal axis L, a contour which corresponds approximately to an isosceles triangle with rounded corners, wherein the rounded corners are formed by the clamping faces 12.

As can be seen in FIG. 9 to FIG. 12, the cutting head 4 is formed in a manner free of undercuts, thereby allowing direct powder metallurgical production by pressing and sintering, wherein mechanical reworking by grinding is necessary only in the region of the cutting edges 4a.

The fastening of the cutting head 4 to the tool shank 2 and the releasing of said cutting head 4 from said tool shank 2 will now be described in more detail with reference to FIG. 3 and FIG. 13 to FIG. 16.

Figure 15:
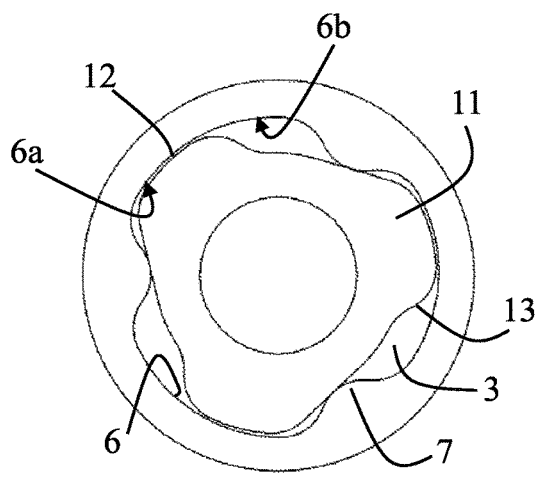
FIG. 15: shows a basic illustration corresponding to FIG. 11 to explain the clamping connection between the cutting head and the tool shank.

In order to fasten the cutting head 4 to the tool shank 2, first of all the threaded bush 8 is screwed into the threaded bore 5 in the tool shank 2, such that the head portion 8b of the threaded bush 8 is received in the second portion 3c of the recess 3. Subsequently, the protrusion 11 is introduced into the first portion 3a of the recess 3, wherein the clamping faces 12 are arranged opposite the first regions 6a of the centering faces 6 for introducing purposes, as is illustrated in FIG. 13 and FIG. 15. The distance of the first regions 6a of the centering faces 6 from the longitudinal axis L is selected such that it is somewhat greater than the distance of the clamping faces 12 from the longitudinal axis L, such that the protrusion 11 can be introduced into the recess 3 in this orientation. The cutting head 4 and the tool shank 2 are moved toward one another in the longitudinal direction until the bearing face 4d of the cutting head 4 is supported against the abutment face 2d of the tool shank 2.

Figure 16:
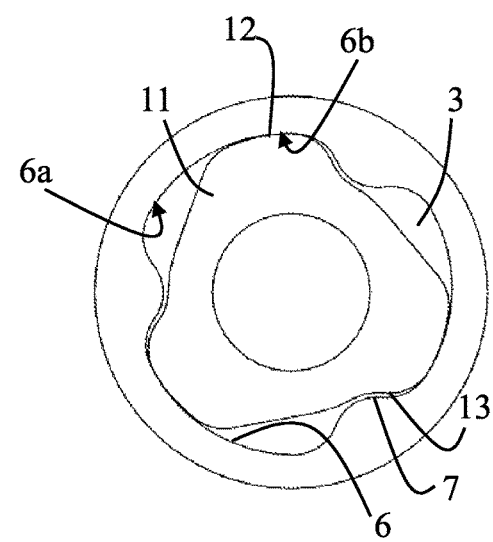
FIG. 16: shows a basic illustration corresponding to FIG. 12 to explain the clamping connection.

By rotation of the cutting head 4 about the longitudinal axis L relative to the tool shank 2, the clamping faces 12 of the protrusion 11 are moved in the tangential direction from the first regions 6a to the second regions 6b of the centering faces 6 in the recess 3, as is illustrated in FIG. 14 and FIG. 16. In the process, the clamping faces 12 move along the centering faces 6. The distance of the second regions 6b of the centering faces 6 from the longitudinal axis L is selected such that it is somewhat smaller than the distance of the clamping faces 12 from the longitudinal axis L. During the rotation of the cutting head 4 relative to the tool shank 2, the centering faces 6 thus press against the clamping faces 12 substantially in the radial direction, such that a force-fitting clamping connection is formed between the clamping faces 12 and the centering faces 6. During this movement, centering of the cutting head 4 relative to the tool shank 2 takes place at the same time.

The possible rotation of the cutting head 4 relative to the tool shank 2 is limited by the stop portions 6 and the flattened portions 13, interacting therewith, which prevent further relative movement when the clamping faces 12 are located opposite the second regions 6b of the centering faces 6. As a result of this limiting of further rotation, the acting force for the force-fitting connection of the cutting head 4 to the tool shank 2 can be determined reliably via the angle which the centering faces 6 enclose with the clamping faces 12 in their contact region, and by the possible angle of rotation which is given substantially by the width of the clamping faces 12 compared with the width of the centering faces 6 in the tangential direction. The angle which the centering faces 6 enclosed with the clamping faces 12 in the contact region can in this case be determined via the extent to which the centering faces 6 approach to the longitudinal axis from the first region 6a to the second region 6b. In the exemplary embodiment, during the movement into the clamping position, a relative rotation of the cutting head 4 through about 35° with respect to the tool shank 2 is allowed. In order to achieve reliable force-fitting fastening, a relative rotation through at least 15°, preferably at least 20°, more preferably at least 25° should be allowed.

The forces, acting virtually exclusively in the radial direction, of the force-fitting connection between the clamping faces 12 and the centering faces 6 have the result that self-locking occurs, preventing the cutting head 4 from detaching from the tool shank 2 again.

The fastening of the cutting head 4 to the tool shank 2 is concluded in that the fastening screw 9 is guided by way of its threaded portion through the bore 10 and is screwed into the internal thread 8d of the threaded bush 8 until the underside of the head of the fastening screw 9 is supported on the abutment face 10c of the bore 10. As a result of the already formed force-fitting connection between the cutting head 4 and the tool shank 2, the forces acting on the fastening screw 9 during operation of the milling tool 1 are very low.

In order to release the cutting head 4 from the tool shank 2, the fastening screw 9 is screwed out of the internal thread 8d of the threaded bush 8 again and removed from the milling tool 1. On account of the force-fitting connection which is formed between the clamping faces 12 and the second regions 6b of the centering faces 6, the cutting head 4 is not yet released from the tool shank 2 in this state. Once the fastening screw 9 has been removed, a screwdriving tool, for example a hexagon screwdriving tool, can be guided through the bore 10 and can be brought into engagement with the profile 8a for engagement by a screwdriving tool in the threaded bush 8. By screwing the threaded bush 8 out of the threaded bore 5, the front side 8f of the threaded bush 8 moves against the underside of the cutting head 4, such that, as a result of continued screwing out of the threaded bush 8, the force-fitting connection between the cutting head 4 and the tool shank 2 can be released in that the protrusion 11 is pushed out of the first portion 3a of the recess 3. In this way, reliable releasing of the cutting head 4 from the tool shank 2 is allowed even when relatively large clamping forces act between the clamping faces 12 and the second regions 6b of the centering faces 6.

Variation

Although an embodiment in which the protrusion 11 of the clamping connection is formed on the cutting head 4 and the recess 3 is formed on the tool shank 2 has been described, it is also possible to provide an opposite arrangement of the protrusion 11 and recess. In this case, the protrusion 11 is provided on the front side of the tool shank 2 and has, in the same way, the clamping faces 12 and the flattened portions 13, and the recess 3 is formed in the rear side 4c of the cutting head 4 and has, in the same way, the centering faces 6 and the abutment portions 7 formed between the latter. In this case, too, the threaded bush 8 can be provided and arranged in a coaxial bore which extends from the free end into the protrusion 11.

The invention claimed is:
1. A milling tool, comprising:
a tool shank having a longitudinal axis and a forward end;
a cutting head fastened to said forward end of said tool shank, said cutting head having a plurality of cutting edges for machining a work piece;
a clamping connection interconnecting said cutting head with said tool shank, said clamping connection having a protrusion circumferentially formed with a plurality of clamping faces, and a recess circumferentially formed with a plurality of centering faces configured to interact with said clamping faces;
each of said centering faces in said recess having a first region and a second region, said first region of said centering faces being spaced apart from said longitudinal axis by a first spacing distance, in a section perpendicular to said longitudinal axis, said first region merging into said second region in which said centering faces are spaced apart from said longitudinal axis by a smaller second distance in the section perpendicular to said longitudinal axis, wherein said protrusion is introducible into said recess with said clamping faces between said first regions of said centering faces and said clamping face are movable, by rotation of said cutting head about said longitudinal axis relative to the tool shank, into a clamping position in which said clamping faces interact by way of a force-fit with said second regions of said centering faces; and
said recess being formed with a plurality of radially inwardly projecting stop portions between said centering faces, said stop portions being configured for limiting a rotation of said cutting head about said longitudinal axis relative to said tool shank.

2. The milling tool according to claim 1, wherein said clamping faces extend in a common circle, and said common circle has a center located on said longitudinal axis, when viewed in a section perpendicular to said longitudinal axis.

3. The milling tool according to claim 1, wherein said clamping faces extend along a common cylinder surface or a common cone surface having an axis of symmetry coinciding with said longitudinal axis of said tool shank.

4. The milling tool according to claim 1, wherein said protrusion is formed with three clamping faces.

5. The milling tool according to claim 1, wherein said clamping faces form a radially farthest protruding regions of said protrusion in a section perpendicular to said longitudinal axis.

6. The milling tool according to claim 1, wherein said cutting head is formed with a bore for receiving a fastening screw, said bore extending in an axial direction through said cutting head.

7. The milling tool according to claim 6, wherein said tool shank is formed with a threaded bore coaxial to said bore in said cutting head, for fastening said cutting head to said tool shank.

8. The milling tool according to claim 7, further comprising a threaded bush having an external thread for meshing with said threaded bore in said tool shank, and an internal thread for meshing with a fastening screw for fastening said cutting head.

9. The milling tool according to claim 8, wherein said threaded bush has an outside diameter, at least on a side facing said cutting head, which is greater than an inside diameter of said bore in said cutting head.

10. The milling tool according to claim 8, wherein said threaded bush, on a side facing towards said cutting head, is formed with a profile for engagement by a screw driving tool.

11. The milling tool according to claim 10, wherein said bore formed in said cutting head for receiving said fastening screw has a diameter coordinated with said profile for engagement by the screw driving tool such that the screw driving tool may be brought into engagement with said profile through said bore in said cutting head.

12. The milling tool according to claim 1, wherein said protrusion of said clamping connection is formed integrally with said cutting head and said recess of said clamping connection is formed in said forward end of said tool shank.

13. The milling tool according to claim 1, wherein the protrusion of the clamping connection is formed integrally with said tool shank and said recess of said clamping connection is formed in said cutting head.

14. The milling tool according to claim 1, wherein said cutting head is formed of a hard material.

15. The milling tool according to claim 14, wherein said hard material is selected from the group consisting of hard metal and cermet.

16. A method for fastening a cutting head to a tool shank of a milling tool, the tool shank having a longitudinal axis and the cutting head having a plurality of cutting edges for machining a work piece, wherein the tool shank and the cutting head are connected to one another via a clamping connection, the clamping connection having a protrusion formed circumferentially with a plurality of clamping faces, flattened portions between adjacent ones of the clamping faces, and a recess formed circumferentially with a plurality of centering faces configured to interact with the clamping faces, and stop portions projecting radially inward relative to the centering faces, the stop portions being between the centering faces wherein the centering faces each have a first region in which the centering faces are located at a first distance from the longitudinal axis, in a section perpendicular to the longitudinal axis, and the first region merges into a second region in which the centering faces are at a smaller second distance from the longitudinal axis in the section perpendicular to the longitudinal axis, the method comprising:
introducing the protrusion into the recess with the clamping faces of the protrusion between the first regions of the centering faces;
subsequently rotating the cutting head about the longitudinal axis relative to the tool shank into a clamping position, to thereby mutually engage the clamping faces with the second regions of the centering faces in a force-fitting connection and in the clamping position, the stop portions and the flattened portions interacting therewith prevent further relative rotation.

* * * * *